United States Patent
Guo et al.

(10) Patent No.: US 9,342,291 B1
(45) Date of Patent: May 17, 2016

(54) DISTRIBUTED UPDATE SERVICE

(71) Applicant: Amazon Technologies, Inc., Reno, NV (US)

(72) Inventors: Jiaqi Guo, Seattle, WA (US); Matthew D. Klein, Seattle, WA (US); Gang Li, Bellevue, WA (US); Baogang Song, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 167 days.

(21) Appl. No.: 13/677,081

(22) Filed: Nov. 14, 2012

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
CPC ...................................................... G06F 8/65
USPC ......................................................... 717/170
See application file for complete search history.

(56) References Cited

U.S. PATENT DOCUMENTS

| | | | |
|---|---|---|---|
| 5,909,581 | A | 6/1999 | Park |
| 6,263,499 | B1 | 7/2001 | Nakamura et al. |
| 6,687,901 | B1 | 2/2004 | Imamatsu |
| 7,260,818 | B1 | 8/2007 | Iterum et al. |
| 7,350,202 | B2 | 3/2008 | Welfeld |
| 7,546,495 | B2 | 6/2009 | Brondijk |
| 7,716,660 | B2 | 5/2010 | Mackay |
| 8,090,794 | B1 | 1/2012 | Kilat et al. |
| 8,245,220 | B2 | 8/2012 | Imamatsu |
| 8,260,818 | B1 | 9/2012 | Polydov |
| 8,453,148 | B1 | 5/2013 | Hobbs |
| 2004/0054764 | A1* | 3/2004 | Aderton et al. ............... 709/223 |
| 2004/0073901 | A1 | 4/2004 | Imamatsu |
| 2005/0066002 | A1* | 3/2005 | Teres et al. .................... 709/204 |
| 2006/0168578 | A1 | 7/2006 | Vorlicek |
| 2007/0118530 | A1 | 5/2007 | Chow et al. |
| 2008/0184216 | A1 | 7/2008 | Muedsam |
| 2008/0244577 | A1 | 10/2008 | Le et al. |
| 2009/0138869 | A1 | 5/2009 | Fitzgerald et al. |
| 2009/0144717 | A1* | 6/2009 | Tamkin et al. ................ 717/170 |
| 2009/0150878 | A1 | 6/2009 | Pathak et al. |
| 2009/0217244 | A1 | 8/2009 | Bozak et al. |
| 2009/0300593 | A1 | 12/2009 | Faus et al. |
| 2010/0145914 | A1 | 6/2010 | Kanno et al. |

(Continued)

OTHER PUBLICATIONS

Wang, Zhenwu. "An Extensible Workflow Modeling Model Based on Ontology." Granular Computing (GrC), 2010 IEEE International Conference on. IEEE, 2010.*

(Continued)

*Primary Examiner* — Qing Chen
*Assistant Examiner* — Clint Thatcher
(74) *Attorney, Agent, or Firm* — Knobbe, Martens, Olson & Bear, LLP

(57) ABSTRACT

Systems and methods are disclosed that facilitate the updating of target computing devices based on versioning information. The updates to the target computing devices can utilize a series of external client workflow integration points, or integration points. The integration points allow the client computing device to interact with the computing device management component and dictate the workflow process associated with the implementation of the update procedure on the target computing device. The integration points can also be used by the client to perform additional processes specific to the client's policy-based protocols.

30 Claims, 11 Drawing Sheets

(56) References Cited

U.S. PATENT DOCUMENTS

| | | |
|---|---|---|
| 2010/0161717 A1 | 6/2010 | Albrecht et al. |
| 2010/0179940 A1 | 7/2010 | Gilder et al. |
| 2011/0209162 A1* | 8/2011 | Machiraju et al. ............ 719/328 |
| 2012/0102481 A1 | 4/2012 | Mani et al. |
| 2012/0159469 A1 | 6/2012 | Laor |
| 2012/0174095 A1 | 7/2012 | Natchadalingam et al. |
| 2012/0304163 A1 | 11/2012 | Raman et al. |
| 2015/0012914 A1* | 1/2015 | Klein ..................... G06F 9/44 717/170 |

OTHER PUBLICATIONS

"Semaphore"; 4d.com website as captured by the Wayback Machine Internet Archive (archive.org); Oct. 31, 2011.*

Dave Taylor; "How Do I Update the Apps on My Apple iPhone?"; Ask Dave Taylor website (askdavetaylor.com); Sep. 27, 2010.*

"About Watch Folders", Microsoft Technet, Feb. 27, 2012.

* cited by examiner

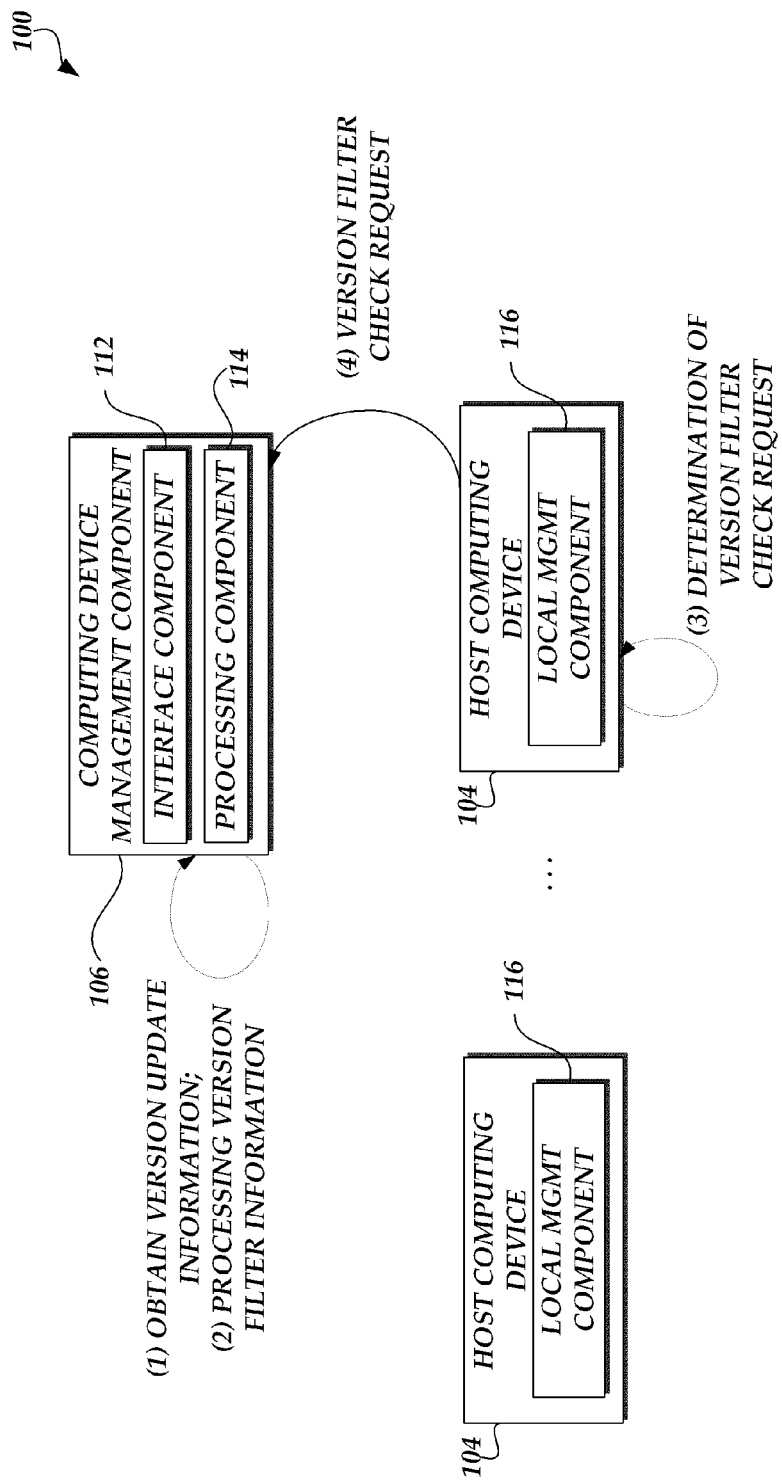

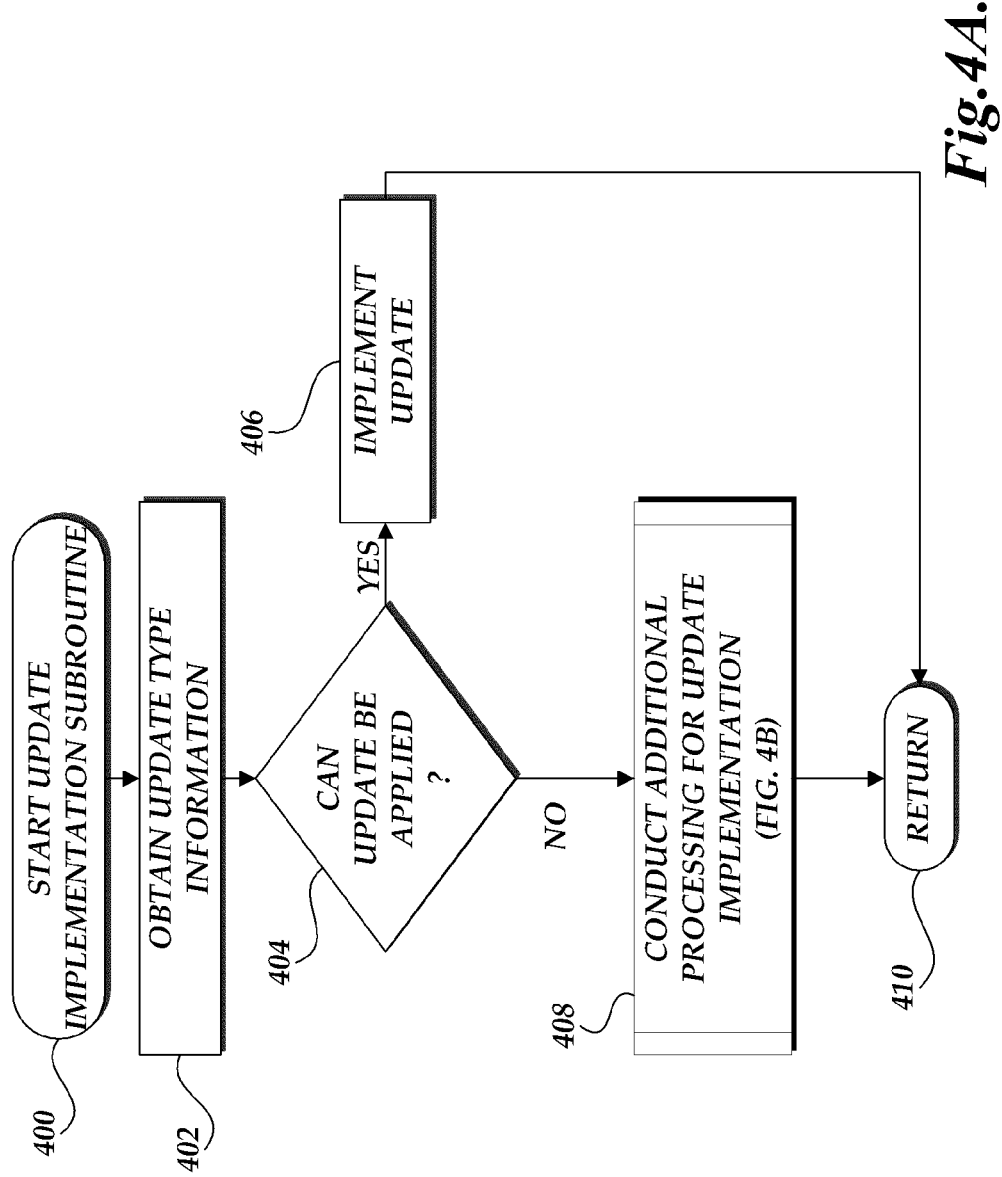

DISTRIBUTED UPDATE SERVICE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In some scenarios, the physical computing devices or instances of a virtual machine may be configured according to a number of virtual machine instance types to provide specific functionality, often referred to as provisioning. For example, various computing devices may be associated with different combinations of operating systems or operating system configurations, hardware resources (actual or virtualized) and software applications to enable a computing device to provide different desired functionalities, or to provide similar functionalities more efficiently. These customized configurations are often provided within a device image, which a computing device may process in order to implement the desired software configuration and which can be standardized among a set of host computing devices.

Once the initial provisioning has occurred or while an initial provisioning is occurring, however, at least a portion of the machine image (e.g., the operating environment, software applications, or configurations) may need to be updated. It can be difficult for a service provider to identify all possible host computing devices that may require updating or to implement update information for a large set of host computing devices.

BRIEF DESCRIPTION OF THE DRAWINGS

The foregoing aspects and many of the attendant advantages will become more readily appreciated by reference to the following detailed description, when taken in conjunction with the accompanying drawings, wherein:

FIGS. 2A-2C are simplified block diagrams of the virtual network of FIG. 1 illustrating the updating of host computing devices based on version filter information;

FIG. 4A is a flow diagram illustrating an update implementation subroutine implemented by a computing device;

DETAILED DESCRIPTION

Figure 1:
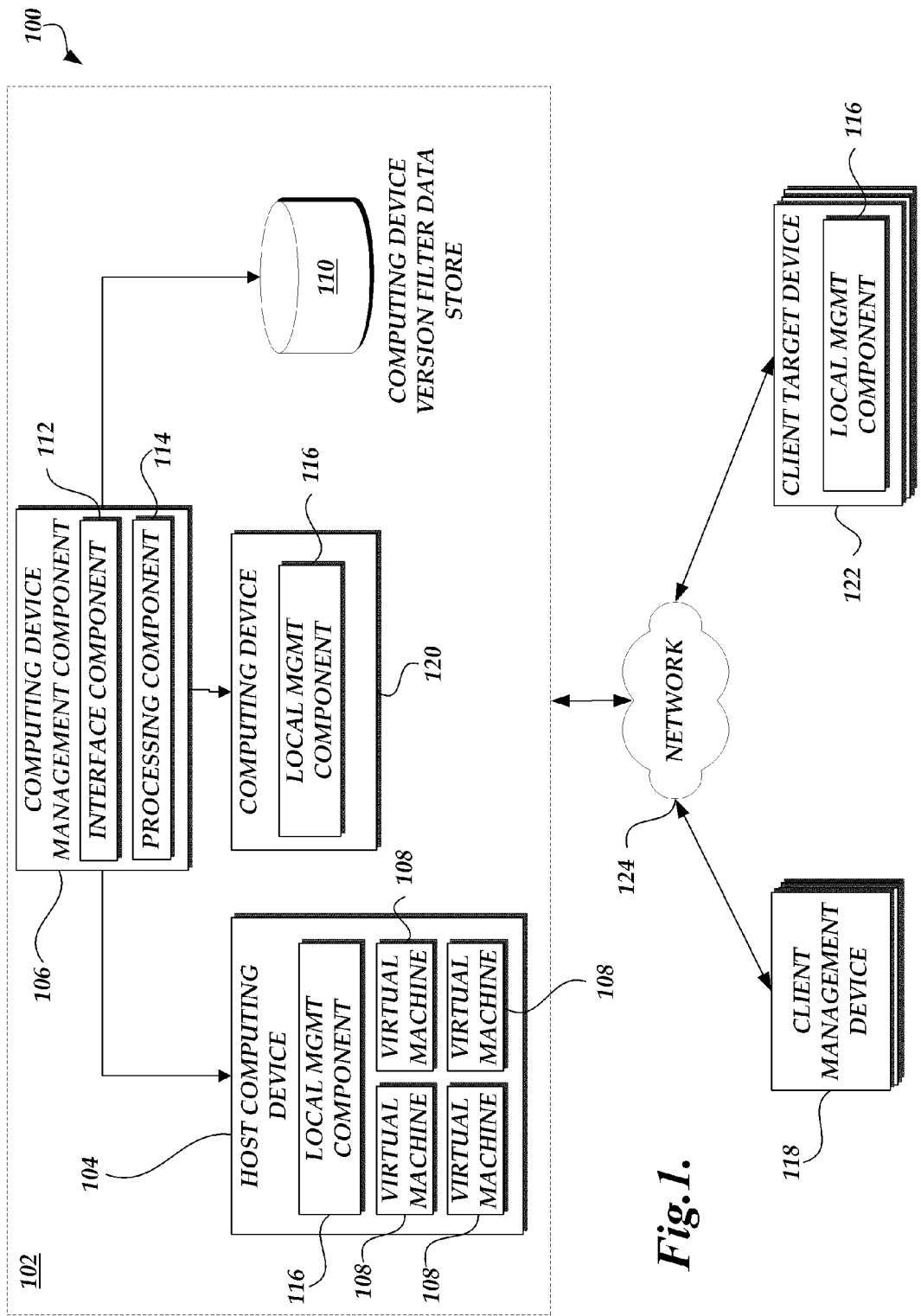
FIG. 1 is a block diagram depicting an illustrative virtual network environment including a number of computing devices and a computing device management component.

Generally described, aspects of the present disclosure relate to the management of computing devices. Specifically, systems and methods are disclosed that facilitate the updating of target computing devices, such as host computing devices or client computing devices, based on versioning information. A set of computing devices are provisioned with a local computing device management component. Each local computing device management component periodically transmits a request to a computing device management component to determine whether version information associated with the respective computing device corresponds to a desired goal state for the computing device. Illustratively, the desired goal state of each computing device can be expressed in the form of version filter information. Based on a processing of the version filter information with the current version information of the computing device, the computing device management component can facilitate the implementation of updates to the requesting target computing device.

The target computing devices can be associated with clients that interact with the target computing devices through client management devices. In some instances an update may need to proceed in accordance with specific procedures and processes determined by a client's policy-based protocols. The system and method for performing updates to the target computing devices can utilize a series of external client workflow integration points, or integration points. The integration points allow the client computing device to interact with the computing device management component and dictate the workflow process associated with the implementation of the update procedure. The integration points can also be used by the client to perform additional processes specific to the client's policy-based protocols.

Illustratively, client management devices may register instructions at one or more integration points. At each integration point, the computing device management component transmits a message to the client computing device. The transmitted message informs the client computing device of the current stage of the update process for the host computing system. The computing device management component can wait to proceed with the processing of the update until a response has been received from the client computing device. The response from the client management device provides instructions to the computing device management component on how to proceed with the implementation of the update.

In some embodiments, the computing device management component can implement pre-condition integration points as part of a workflow process. Illustratively, pre-condition integration points allow client management devices to determine whether to initiate the update process for a target computing device. The pre-condition phase occurs prior to performing mutable actions related to the processing of an update for the target computing system.

In another embodiment, the computing device management component can implement pre-update integration points as part of a workflow process. Illustratively, pre-update integration points allow client management devices to perform any tasks that need to be performed prior to implementing the update on the host computing device. For example, a client management device may communicate with other related computing systems, adjust operating parameters, or perform other processes in anticipation of an update being performed on the target computing system.

In a further embodiment, the computing device management component can implement post-update integration points as part of a workflow process. The post-update integration points allow client management devices to perform post-update processes after the update has been implemented. For example, testing and monitoring of the target computing device may be performed on the host to verify proper operation prior to returning the target computing device to its previous operational state.

In yet other embodiments, the target computing devices are defined into specific host sets. Each host set can have one or more computing devices assigned to the host set. The host set can also have one or more host set parameters that at least partially dictates how updates are implemented on target computing devices within the host set.

While specific embodiments and example applications of the present disclosure will now be described with reference to the drawings, these embodiments and example applications are intended to illustrate, and not limit, the present disclosure. The term "target computing device" can refer to computing devices, client computing devices, and host computing devices that undergo the systems and methods described herein. The "target computing device" can be physical computing devices, instantiated virtual machine instances, or combinations of physical computing devices and instantiated virtual machine instances. The term "target computing device" does not imply the configuration of any specific functionality for a computing device or the requirement that the computing device host one or more virtual machine instances. Additionally, while various embodiments and aspects of the present disclosure will be described with regard to computing devices, client computing devices and host computing devices hosting virtual machine instances running applications, one or more aspects of the present disclosure can be applied with physical computing devices or combinations of physical computing devices and instantiated virtual machine instances. Accordingly, reference to the term "host computing device" does not imply the configuration of any specific functionality for a computing device or the requirement that the computing device host one or more virtual machine instances. Still further, one or more aspects of the present disclosure may be applicable to a variety of client computing devices and computing devices, including, but not limited to, networking computing devices. Still further, although various types of integration points are disclosed in the present disclosure, one skilled in the relevant art will appreciate that no particular combination or order of integration point are required to be implemented.

FIG. 1 is a block diagram illustrating an embodiment of a virtual network environment 100. The virtual network environment 100 includes a virtual network 102 in communication with a plurality of client computing devices 118 and 122 through a network 124. The virtual network includes multiple physical computing devices, generally referred to herein as host computing devices 104. Each host computing device 104 is capable of hosting multiple virtual machine instances 108. At least some of the virtual machine instances 108 may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 102 is logical in nature and can encompass physical computing devices 104 from various geographic regions. As will be described in greater detail below, each host computing device 104 includes a local computing device management component 116 for transmitting version filter checks to a host computing device management component 106 and processing the results of the check. In a further embodiment, the virtual network 102 can include one or more computing devices 120 that correspond to any one of a variety of computing devices, including, but not limited to network computing devices (e.g., routers, switches, etc.), communication computing devices and the like. For example, one of the computing devices 120 can correspond to a router or switch or a computing device configured to emulate the functionality of the router or switch in the virtual network 102.

The virtual network 102 also includes a computing device management component 106 for processing requests for the determination of updates to host computing devices 104. Additionally, the computing device management component 106 can provide updates to one or more of host computing devices 104. Although illustrated as a single, stand-alone component, the computing device management component 106 can be implemented in a distributed manner. Additionally, one or more aspects of the computing device management component 106 may be implemented in other computing devices, such as a virtual machine instance.

With continued reference to FIG. 1, the virtual network 102 can further include a computing device version filter data store 110 for maintaining, at least in part, version filter information that corresponds to a defined goal state for version information for host computing devices 104, client target devices 122, or computing devices 120. Additionally, the computing device version filter data store 110 can include information, such as executable code, configuration settings/information and other information, utilized to identify or implement updates for the host computing devices 104, client target devices 122, or computing devices 120. The computing device version filter data store 110 may correspond to network attached storage (NAS), database servers, local storage, or other storage configurations which may be implemented in a centralized or distributed manner. Additionally, although a single host computing device version filter data store 110 is illustrated, one skilled in the relevant art will appreciate that any number of data stores may be utilized to implement the computing device version filter data store 110.

Connected to the virtual network 102 via a network 120 are multiple client computing devices 118 and 122. As used herein, client computing devices refers to physical computing devices that may not be part of the virtual network 102. The client computing devices can be generally referred to as client management devices 118 or client target devices 122 depending on the function implemented by the computing device. However, references to client management devices and client target devices should not be construed as limiting, as a client computing device can be in one instance a client management device 118 and in another instance the same client computing device can be a client target device 122.

Each client target device 122 may be provisioned to provide a variety of different desired functionalities. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center.

The network 120 may be, for instance, a wide area network (WAN), a local area network (LAN), or a global communications network. In some instances, the client computing devices 118 and 122 may interact with the virtual network 102 to request or define version filter information or to define a distribution of version filter information for a set of host computing devices 104.

In some instances, the client computing devices 118 can communicate with the virtual network 102 and the computing device management component 106 using a notification or messaging service. The client computing devices 118 can use the notification service to send asynchronous communications to the virtual network and computing device management component 106, and vice-versa.

In one embodiment, the client computing device 118 associates a messaging service topic with one or more host computing devices 104 to which the virtual network 102 subscribes. The computing device management component 106 also has a messaging service topic associated with the same host computing devices 104 to which the client computing device 118 subscribes. The client computing device 118 can receive information from the virtual network 104 and provide information to the virtual network 104 in an asynchronous manner. For example the computing device management component 106 can publish information to the client computing device 118 through the messaging service topic and the client computing device 118 can provide responses through the other associated messaging service topic. In one instance the client computing devices can define and modify host sets using the notification service and can send responses to queries from the computing device management component 106.

In another embodiment the computing device management component 112 can communicate with the client management device 118 in accordance with an API specific to the client management device. The client management device 118 can communicate with the computing device management component 112 in accordance with an API for the virtual network 102. In some embodiments, the client management device 118 can communicate with the virtual network through an API and the computing device management component 106 can communicate with the client management device 118 through a messaging service, or vice-versa.

In one instance, the computing device management component 106 can send an integration point message to the client computing device that can include a target asset identification, a deployment identification, a release identification, a scope identification, an integration point identification, an integration request/response identification and custom token data. The client computing device 118 can send an integration point response message to the computing device management component 106 that can include an asset identification, a scope identification, an integration point identification, an integration point request/response identification, a response code and optionally a response message. Among other things, the response code can instruct the computing device manage-ment component 106 to proceed, repeat and suspend. Illustratively, the command to proceed instructs the computing device management component 106 to proceed to the next step in the workflow process. The repeat command instructs the computing device management component 106 to repeat the current step in the workflow process. In some embodiments the computing device management component 106 can wait a period of time after receiving the repeat command before re-sending the integration point message. The suspend commands instruct the computing device management component 106 to suspend the operation, which can be directed to a specific host, a host set, or other grouping.

In some embodiments the computing devices 104, 120 and 122 are defined into host sets or host groupings. Each host set can have one or more computing devices 104, 120 and 122 assigned to the host set. The host sets are customized groupings that can be defined by a client management device 118 or the computing device management component 106. In one embodiment, the host sets can be defined by a client management device 118 and provided to the computing device management component 106. For example, a client management device 118 may create host set A and host set B for a group of ten target computing devices 104. Set A could have three computing devices 104 and Set B could have seven computing devices 104. The client computing device 118 can add or remove host computing devices 104 from the host groupings. Hosts can be added to sets individually or in multiples. In one embodiment the computing device management component 106 tracks the date and time when host computing devices are added to each host set.

Additionally, a host set can have one or more host set parameters. In some instances, the host set parameters can at least partially dictate how updates are implemented on host computing devices 104 within a host set. In one instance a host set parameter may dictate the number of host computing devices 104 within the host set can be updated simultaneously. For example a host set of fifty host computing devices can have a simultaneous update limit of four devices.

Figure 2B:
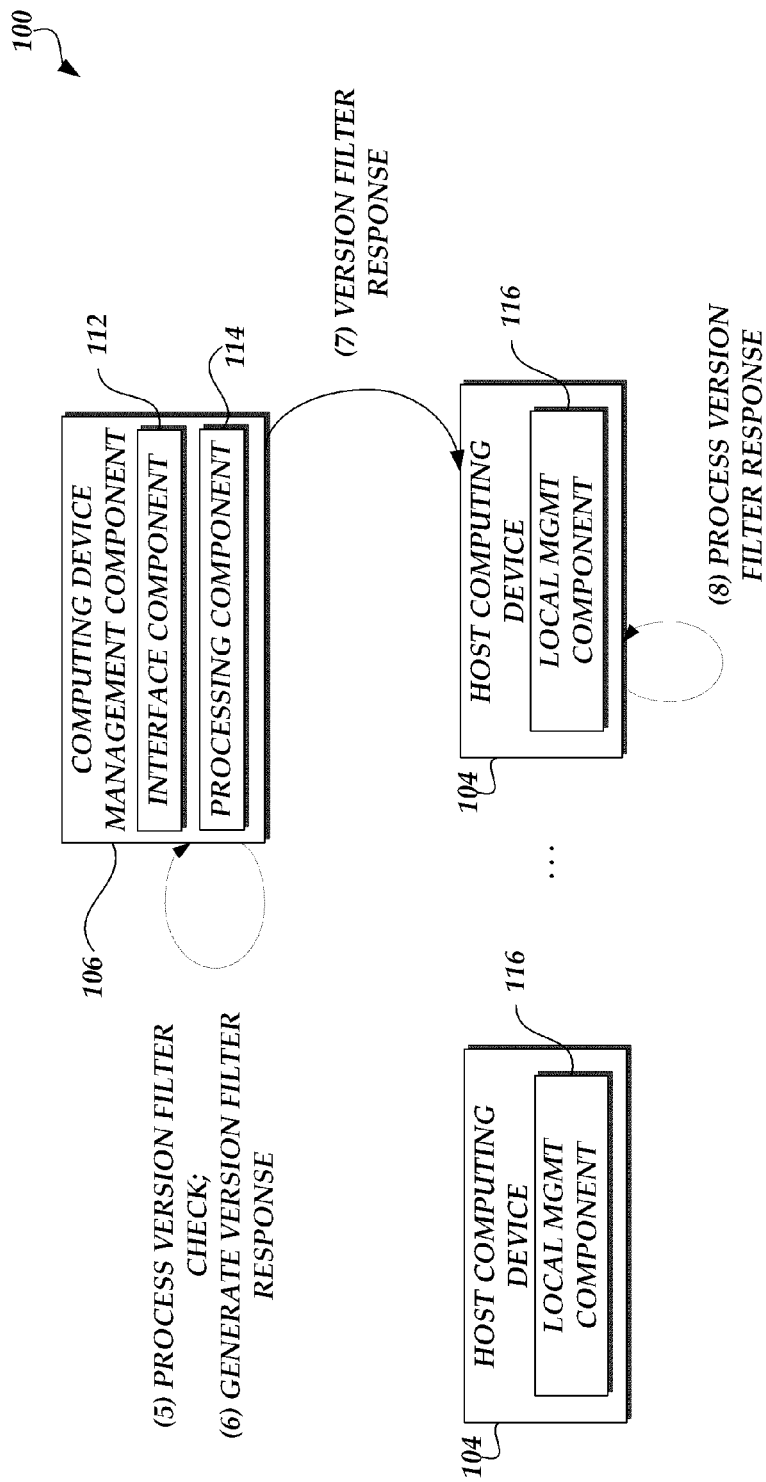
Figure 2C:
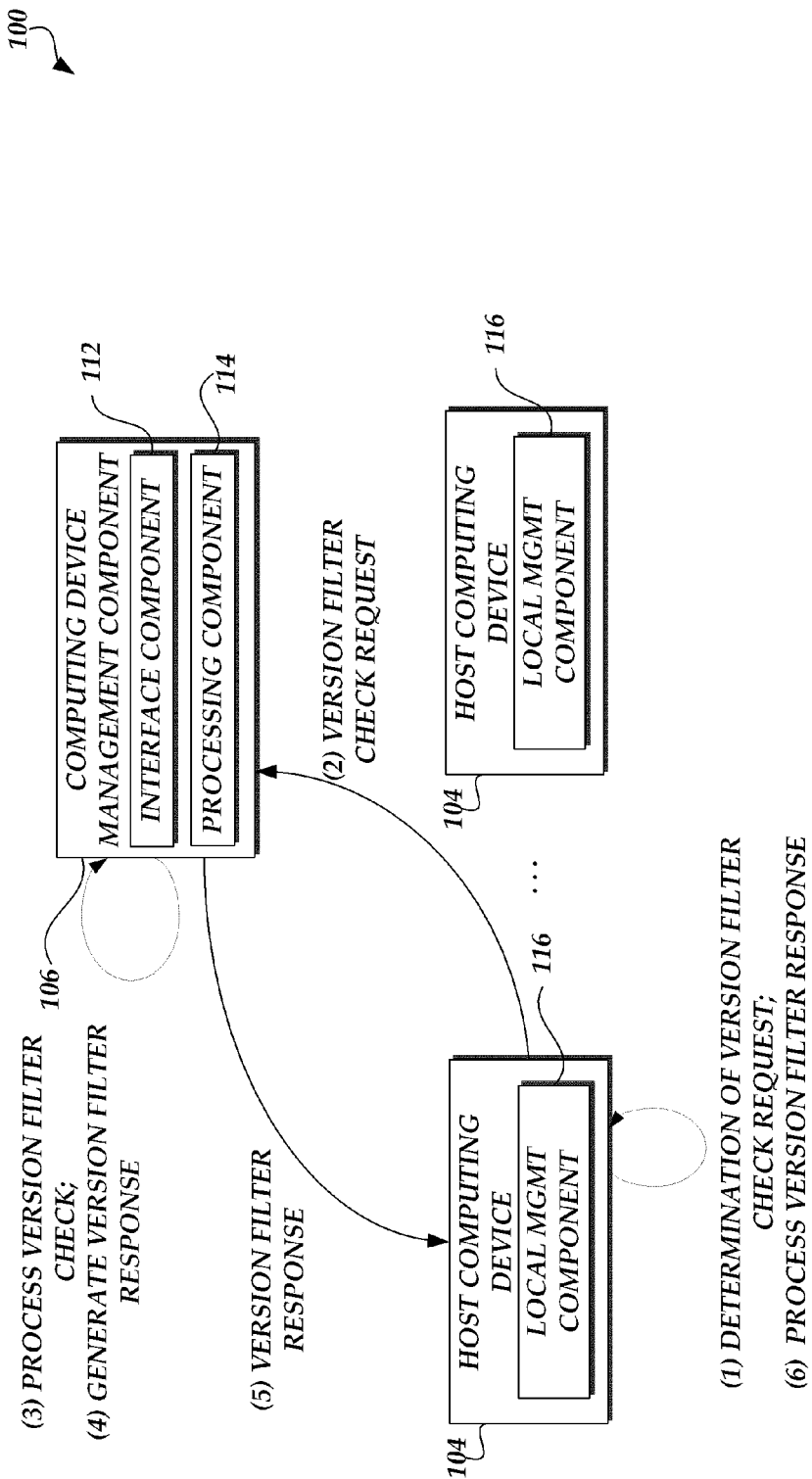

With reference now to FIGS. 2A-2C, illustrative interaction between the components of the virtual network 102 for the updating of host computing devices 104 based on versioning information and version filter information will be described. Although FIGS. 2A-2C will be described with regard to host computing devices 104, one skilled in the relevant art will appreciate that similar interaction may be implemented on any target computing device, such as computing devices 120, client target devices 122 or combinations of host computing devices 104, client target devices 122 and computing devices 120. Accordingly, the interactions illustrated in FIGS. 2A-2C should not be construed as limiting.

With reference first to FIG. 2A, the computing device management component 106 obtains version update information corresponding to a desired version goal state for a set of host computing devices 104 (1). Illustratively, the specification of the desired goal state may be transmitted by a client computing device 118, such as a client computing device associated with a system administrator, in accordance with an Application Protocol Interface ("API"). Alternatively, the computing device management component 106 may make the determination of the desired goal state based on processing information made available by a network based service, processing error reports, or making comparisons of software application or operating system environments of other host computing devices 104.

Illustratively, the computing device management component 106 processes version filter information for each host computing device 104 that is in the virtual network 102 or in a set of host computing devices (2). For example, the computing device management component 106 may process version filter information for each host computing device 104 in a data center. In one embodiment, the computing device management component 106 may not necessarily be able to identify each host computing device 104 that is currently operational in the set of host computing devices (e.g., within a data center). For example, one or more host computing devices 104 may be periodically removed or added to the data center without specific tracking information provided to the computing device management component 106. Accordingly, the version filter information may be defined for host computing devices 104 based on specific identification information for an individual host computing device or based on general characteristics of a host computing device (e.g., any host computing device that is provisioned with a type of software application).

Still further, the modification of the version filter information for a set of host computing devices 104 may be based on a time distribution of updates for the set of host computing devices. In one example, the computing device management component 106 may modify version filter for a small subset of the set of host computing devices as a test group. In another example, the computing device management component 106 may implement a random or pseudo-random modification of version filter information. In still a further example, the computing device management component 106 may apply additional criteria regarding aspects of the host computing devices, such as geographic location, shared computing resources, performance, priority information and the like.

With continued reference to FIG. 2A, at some point, a local computing device management component 116 on a host computing device 104 makes a determination to transmit a version filter check to the computing device management component 106 (3). In one embodiment, the determination whether to transmit the version filter check may be based on time criteria, such as minimum and maximum times for transmitting version filter check requests. In another embodiment, the determination of whether to transmit the version filter check may be based on other criteria, such as a communication network availability, error conditions, performance thresholds (maximum and minimum) and the like. Additionally, the local computing device management component 116 can also implement time based criteria for distributing the timing of the requests to the computing device management component 106. Based on the determination, the local computing device management component 116 transmits the version filter check to the computing device management component 106 (4).

With reference now to FIG. 2B, the computing device management component 106 obtains the filter request and processes a version filter request (5). Illustratively, the computing device management component 106 obtains version information that is included in the version filter check transmitted by the local computing device management component 116. Alternatively, the computing device management component 106 can transmit requests to the local computing device management component 116 for specific information or additional information as necessary. Illustratively, the computing device management component 106 makes a comparison of the current version information associated with the requesting host computing device 104 to determine whether the host computing device is associated with desired version goal state, as defined in the version filter information.

Based on the comparison, the computing device management component 106 can then generate a version filter response (6). In one embodiment, the computing device management component 106 can generate a notification that an update is required. Additionally, the computing device management component 106 can provide update information utilized by the requesting host computing device 104 to cause an update to software code. In another embodiment, the computing device management component 106 can transmit a notification that no update is necessary. Alternatively, the computing device management component 106 may not transmit any notification if the version filter check passes. Still further, the computing device management component 106 can generate information that will be used by the local computing device management component 116 to transmit the next version filter check requests. The resulting information is transmitted to the requesting host computing device 104 (7) and processed (8).

Turning now to FIG. 2C, as previously described, each local computing device management component 116 on the host computing device 104 can make a determination of whether to transmit a version filter check (1). In one embodiment, the determination whether to transmit the version filter check may be based on time criteria, such as minimum and maximum times for transmitting version filter check requests. In another embodiment, the determination of whether to transmit the version filter check may be based on other criteria, such as a communication network availability, error conditions, performance thresholds (maximum and minimum) and the like. Additionally, the local computing device management component 116 can also implement time based criteria for distributing the timing of the requests to the computing device management component 106. Based on the determination, the local computing device management component 116 transmits the version filter check to the computing device management component 106 (2).

The computing device management component 106 obtains the filter request and processes a version filter request (3). Illustratively, the computing device management component 106 obtains version information that is included in the version filter check transmitted by the local computing device management component 116. Alternatively, the computing device management component 106 can transmit requests to the local computing device management component 116 for specific information or additional information as necessary. Illustratively, the computing device management component 106 makes a comparison of the current version information associated with the requesting host computing device 104 to determine whether the host computing device is associated with desired version goal state, as defined in the version filter information.

Based on the comparison, the computing device management component 106 can then generate a version filter response (4). In one embodiment, the computing device management component 106 can generate a notification that an update is required. Additionally, the computing device management component 106 can provide update information utilized by the requesting host computing device 104 to cause an update to executable code, modify configuration information. In another embodiment, the computing device management component 106 can transmit a notification that no update is necessary. Alternatively, the computing device management component 106 may not transmit any notification if the version filter check passes. Still further, the computing device management component 106 can generate information that will be used by the local computing device management component 116 to transmit the next version filter check requests. The resulting information is transmitted to the requesting host computing device 104 (5) and processed (6).

Figure 3:
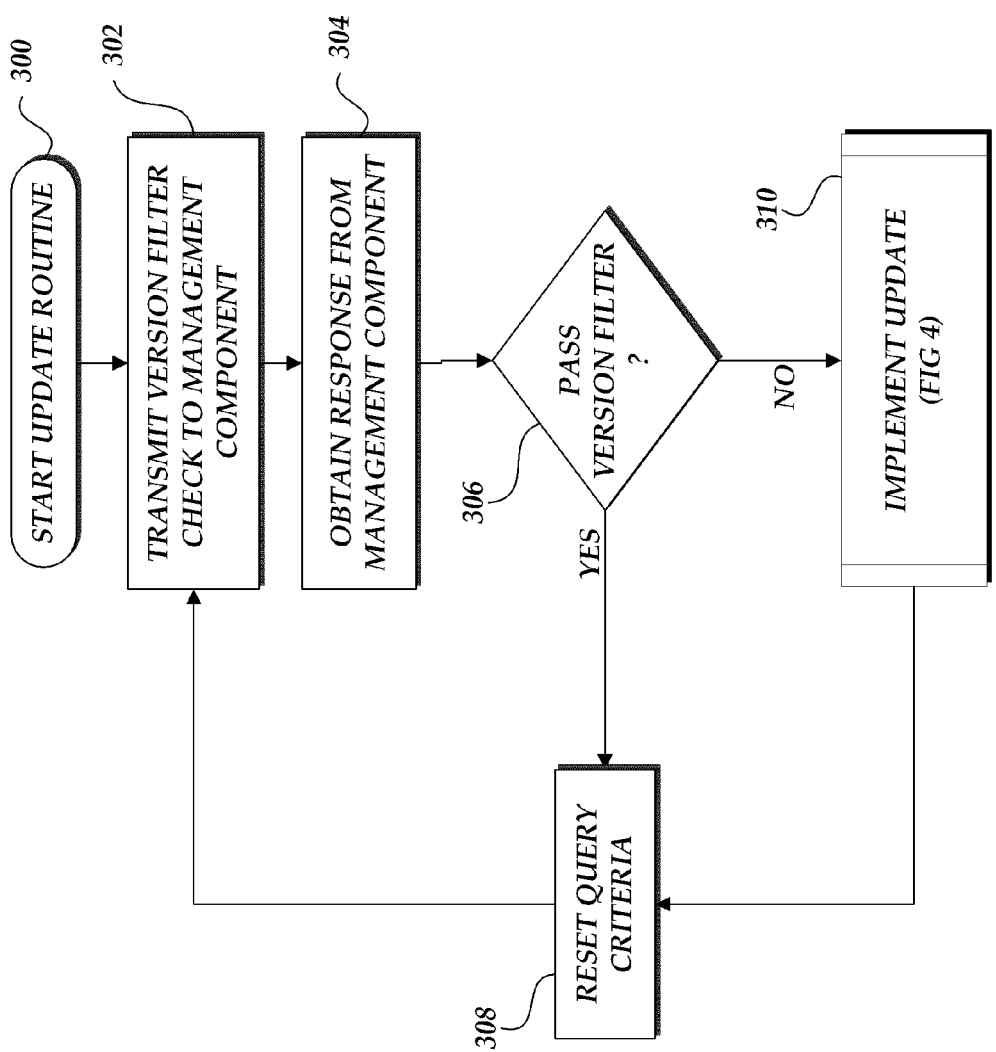
FIG. 3 is a flow diagram illustrating an update routine implemented by a computing device.

Turning now to FIG. 3, a routine 300 for generating an update request, such as a version filter request, implemented by a local computing device management component 116 on a target computing device, such as a host computing device 104, a computing device 120, or a client target device 122 will be described. Although routine 300 will be described with regard to the local computing device management component 116 on a host computing device 104, one skilled in the relevant art will appreciate that one or more portions of routine 300 may be implemented by other components of the host computing device 104. One skilled in the relevant art will also appreciate that the implementation of routine 300 may be implemented on computing devices 120, client target devices 122, or combinations of host computing devices 104, client target devices 122 and computing devices 120.

At block 302, the host computing device 104 transmit a version filter check request to the computing device management component 106. As previously described, in one embodiment, the determination whether to transmit the version filter check may be based on time criteria, such as minimum and maximum times for transmitting version filter check requests. In another embodiment, the determination of whether to transmit the version filter check may be based on other criteria, such as a communication network availability, error conditions, performance thresholds (maximum and minimum) and the like. Additionally, the local computing device management component 116 can also implement time based criteria for distributing the timing of the requests to the computing device management component 106.

At block 304, the host computing device 104 obtains a response from the computing device management component 106. In an illustrative embodiment, the host computing device 104 can obtain information that identifies whether the version filter check resulted in a determination of whether the host computing device satisfies the desired version goal state. Additionally, the resulting information can also include information identifying any updates that should be implemented by the host computing device 104 or the update information itself.

At decision block 306 a test is conducted to determine whether the version filter check indicates that the host computing device satisfies the version filter check (e.g., passes the version filter check). If the host computing device 104 passes the version filter check, at block 308, the local computing device management component 116 resets the query criteria. In one embodiment, the local computing device management component 116 can reset the query criteria by restarting a timer or clearing any criteria utilized to determine whether to transmit the request at block 302. Additionally, the local computing device management component 116 can process any information provided by the computing device management component 106 with regard to controlling the query criteria utilized by the local computing device management component 116.

If at decision block 306, the host computing device 104 does not pass the version filter check information, at block 310, the local computing device management component 116 implements updates based on information provided by the computing device management component 106. An illustrative subroutine for implementing updates based on type information for host computing devices 104 will be described with regard to FIG. 4. However, one skilled in the relevant art will appreciate that the implementation of updates on other computing devices, such as host computing devices 104, computing devices 120, or on client target devices 122, may incorporate additional or alternative criteria. The routine 300 then returns to block 308 in which the local computing device management component 116 resets the query criteria.

Turning now to FIG. 4A, a subroutine 400 for update implementation based on type information on a host computing device 104 will be described. Although FIG. 4 will be described with regard to host computing devices 104, one skilled in the relevant art will appreciate that the implementation of subroutine 400 may be implemented on computing devices 120, client target devices 122, or combinations of host computing devices 104, client target devices 122 and computing devices 120.

Illustratively, the local computing device management component 116 can implement subroutine 400 as part of the execution of block 310 (FIG. 3). At block 402, the local computing device management component 116 obtains update type information for the update to be implementation. In one embodiment, the update type information can specify that the update can be implemented on the host computing device without having to terminate any virtual machine instances or without requiring a reboot. In this embodiment, the local computing device management component 116 may still need to do some additional processing. In another embodiment, the update type information can specify that any existing virtual machine instances may need to be terminated to implement the update, but that the host computing device 104 does not need to be rebooted. In still a further embodiment, the update type information can specify that all existing virtual machine instances need to be terminated and that the host computing device 104 requires a reboot.

At decision block 404, a test is conducted to determine whether the update can be applied (e.g., without termination of any existing virtual machine instances and without requiring a reboot). Illustratively, the local computing device management component 116 can utilize policy information that governs the implementation of updates on the host computing devices 104. For example, policy information for host computing devices 104 hosting virtual machine instances can specify whether or not currently instantiated virtual machine instances need to be terminated prior to implementing updates. In another example, policy information for host computing devices 104 can specify other requirements for the host computing devices that will be utilized to determine whether to implement the update. If the updated can be applied, at block 406, the local computing device management component 116 implements the update and the subroutine 400 returns at block 410.

With reference again to decision block 404, if the update cannot be applied to the host computing device 104 (or other computing device 120), at block 408, the host computing device 104 (or computing device 120) conducts additional processing for update implementation. An illustrative subroutine 450 for conducting additional processing to implement an update will be described with regard to FIG. 4B. At block 410, the subroutine 400 returns.

Illustratively, upon return of the subroutine 400 at block 410, the host computing device 104 (or computing device 120) can reset query criteria and check for additional updates. Accordingly, the host computing device 104 can continuously check and attempt to implement updates. Additionally, in embodiments in which the host computing device 104 (or computing device 120) is in the process of implementing updates that may require the suspension of resources or a reboot, the host computing device 104 can continue to identify and possibly implement additional updates.

Figure 4B:
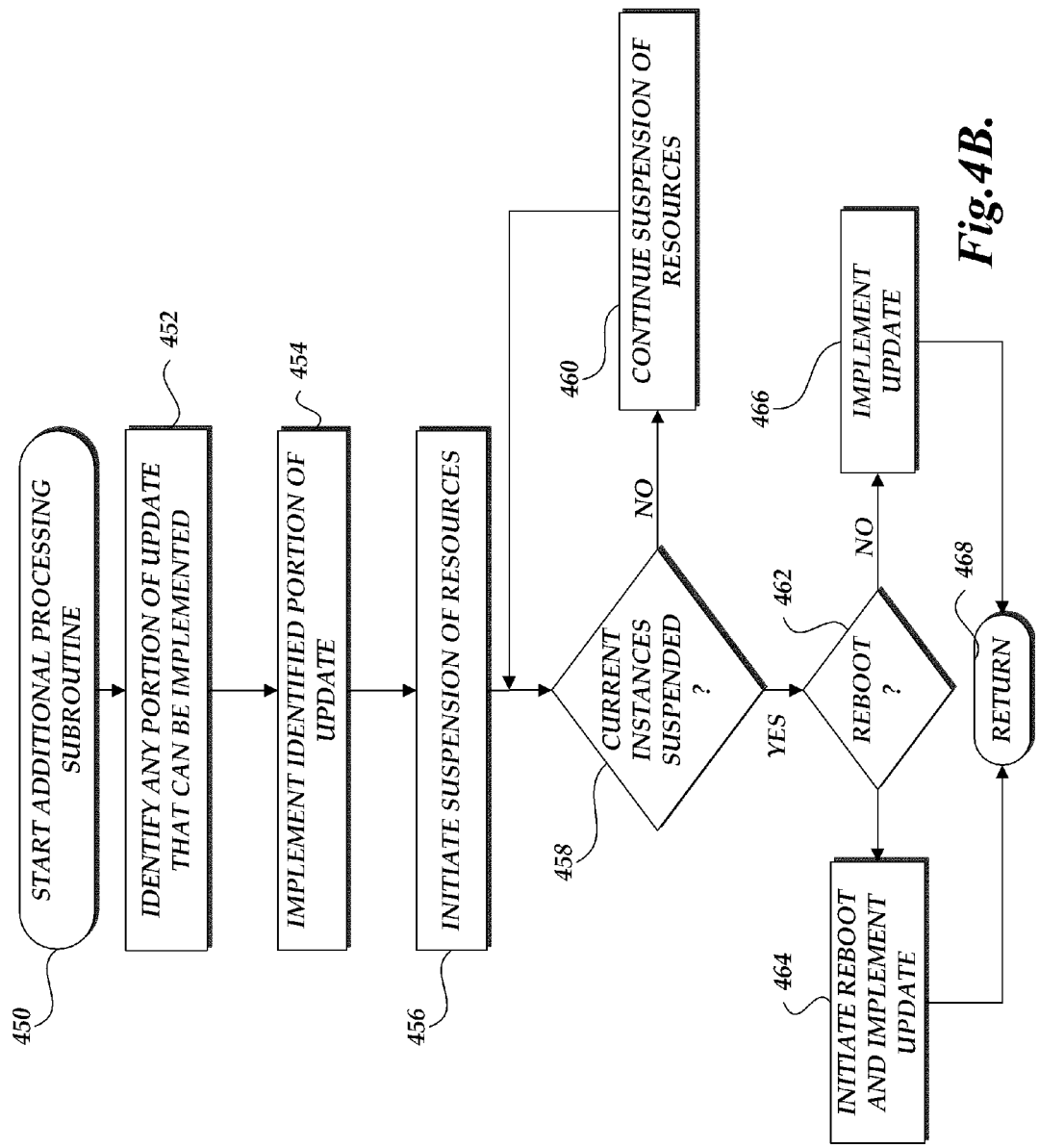
FIG. 4B is a flow diagram illustrating an additional processing subroutine implemented by computing device.

Turning now to FIG. 4B, a subroutine 450 for conducting additional processing in order to implement a pending update will be described. Illustratively, the local computing device management component 116 can implement subroutine 400 as part of the execution of block 408 (FIG. 4A). At block 452, the local computing device management component 116 identifies any portion of the pending update that can be implemented. In an illustrative example, at least some portion of an update may implemented even if other portions of the update are dependent on criteria not yet satisfied, such as completion of a previous update or execution of a process. Accordingly, at block 454, the local computing device management component 116 attempts to implement any identified portions of the update information that are not dependent on criteria (e.g., partial updates).

Once the implementation of the identified partial updates or portions of the updates has been initiated, at block 456, the local computing device management component 116 can initiate the suspension one or more resources that are associated with the specific host computing device 102. In one embodiment, the local computing device management component 116 can determine whether to suspend the execution of virtual machine instances currently being executed by the host computing device 104. In another embodiment, the host computing device 104 (or other computing device 120) can determine whether to cause the termination or suspension of virtual machine instances on other host computing devices 104. For example, a computing device in communication with one or more host computing devices 104 may cause the termination of virtual machine instances on the host computing devices prior to implementing an update.

At decision block 458, a test is conducted to determine whether the identified virtual machine instances that need to be suspended or terminated have been suspended or terminated. If not, the subroutine 400 may enter into a waiting period or attempt additional activities to cause the suspension of resources at block 458. Additionally, the local computing device management component 116 may also check to see whether the request to suspend resources should be terminated. For example, the local computing device management component 116 may determine that the request to suspend (or terminate) resources has taken too long, which may be indicative of a failed attempt or likelihood of failure.

With reference again to decision block 458, once any identified virtual machine instances have been suspended (or otherwise terminated), at decision block 462, a test is conducted to determine whether the host computing device requires a reboot. If the host computing device 104 does not require a reboot, the subroutine 450 proceeds to block 466 in which the local computing device management component 116 implements the update and the subroutine 450 returns at block 468. Alternatively, if a reboot is required, at block 464, the local computing device management component 116 initiates a reboot and implements the update. The subroutine 450 returns at block 468. As previously described, in one embodiment, the implementation of the partial updates and suspension of resources can occur in parallel with determination of additional or subsequent update information and the attempted implementation of the additional or subsequent update information.

Figure 5:
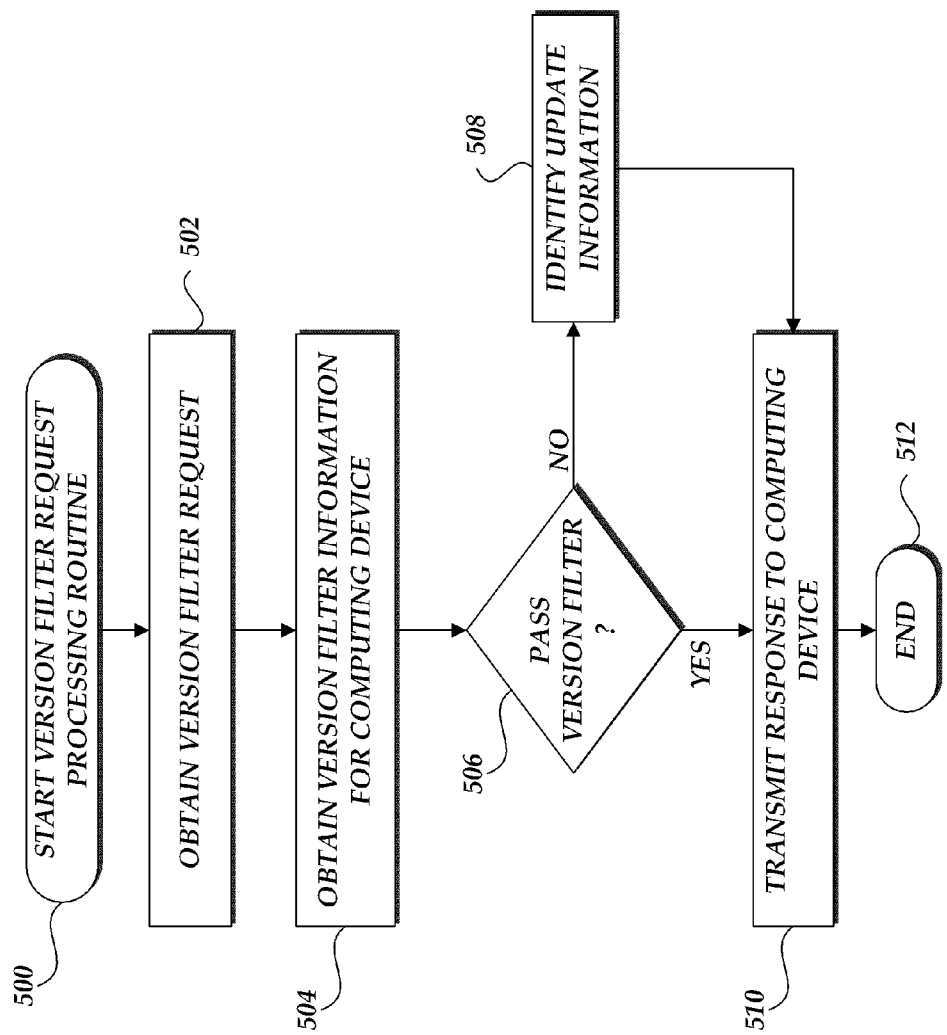
FIG. 5 is a flow diagram illustrating a version filter request processing routine implemented by a computing device management component.

Turning now to FIG. 5, a routine 500 for processing version filter check requests implemented by a computing device management component 106 will be described. Although FIG. 5 will be described with regard to host computing devices 104, one skilled in the relevant art will appreciate that the implementation of routine 500 may be implemented on computing devices 120, client target devices 122, or combinations of host computing devices 104, client target devices 122 and computing devices 120.

At block 502, the computing device management component 106 obtains a version filter request. In one example, the version filter request is transmitted by the local computing device management component 116. As previously described, the local computing device management component 116 can independently transmit the version filter request in accordance with criteria evaluated by the local computing device management component 116 or other information provided by the computing device management component 106. The version filter request can be an API and can include a variety of information that will be utilized by the computing device management component 106 in processing the request. For example, the version filter request can include information identifying operating system and software applications that are executing on the requesting host computing device 104. In another example, the version filter request can include information identifying the last version, or equivalent version, of the operating system and software applications executing on the host computing device 104. In still further examples, the version filter request can include information that is different from previous information provided by the local computing device management component 116.

At block 504, the computing device management component 106 obtains version filter information that specifies the desired version goal state for the identified computing device, such as host computing device 104. The computing device management component 106 can obtain the version filter information from the computing device version filter data store 110 or from local memory (e.g., cache memory). At decision block 506, a test is conducted to determine whether version filter information corresponds to the version information identified in the version request (directly or indirectly).

If the version filter information does not match with the version information, it can be assumed that the computing device, such as host computing device 104, may have one or more updates to implement. Accordingly, at block 508, the computing device management component 106 identifies update information. In one embodiment, the computing device management component 106 can generate a notification that an update is required and identify one or more potential sources of the update. In another embodiment, the computing device management component 106 can generate the notification and provide the update information required (e.g., code to modify the operating system or software application code). If the version filter information matches the version information (e.g., no update is required) or once the notifications and updates are generated at block 508, at block 510, the computing device management component 106 transmit a response to the requesting local computing device management component 116. As previously discussed, however, in one embodiment, if no update is required, the computing device management component 106 can omit the transmission of any information to the local computing device management component 116. At block 512, the routine 500 terminates.

Figure 6:
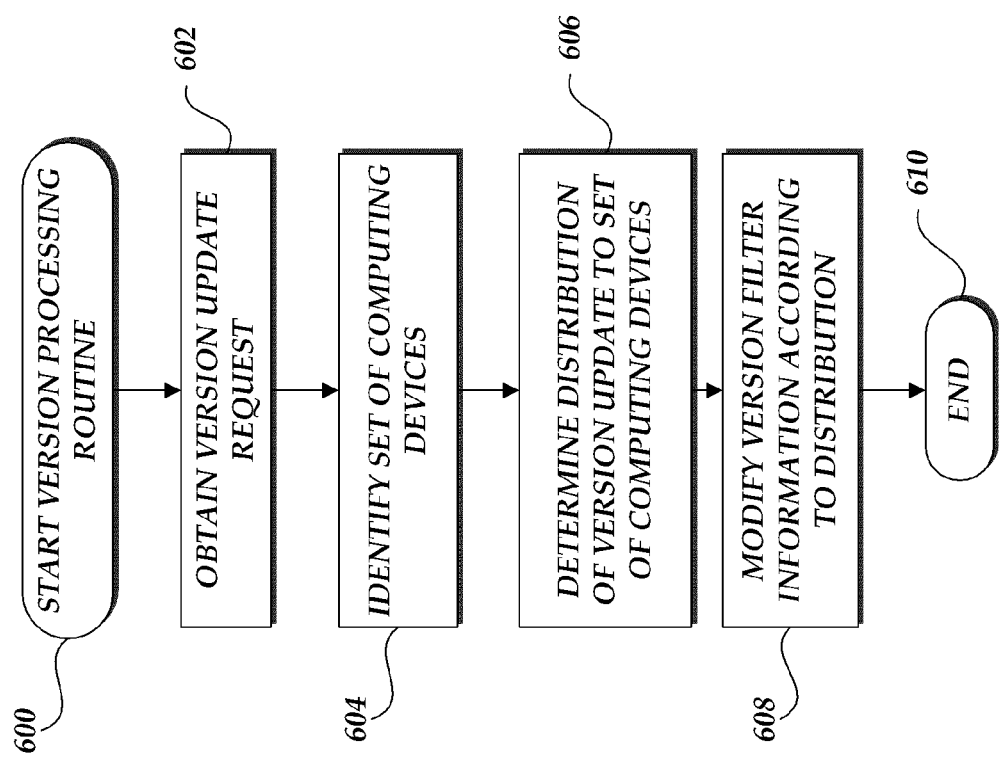
FIG. 6 is a flow diagram illustrating a version processing routine implemented by a host computing device management component.

Turning now to FIG. 6, a routine 600 for creating or managing version filter information will be described. Illustratively, routine 600 can be implemented by a computing device management component 106. However, routine 600 can be implemented, in whole or in part, by other components of the virtual network environment 100.

At block 602, the computing device management component 106 obtains a request or notification corresponding to a version update. Illustratively, the request can correspond to an API (such as from a client computing device 118) that specifies a most current version for a target computing device or set of target computing devices. The request can identify specific computing devices or provide criteria that allow the computing device management component 106 to determine how the version update request will apply to each computing device in the set of computing devices.

At block 604, the computing device management component 106 identifies that set of computing devices, such as a set of computing devices, that correspond to the version update request. In one example, if the version update request specifically identifies individual target computing devices, the computing device management component 106 can utilize the identification information included in the request. In another example, if the version update request includes criteria for selecting the set of computing devices, the computing device management component 106 can process the criteria. Still further, in some situations, the computing device management component 106 may not necessarily be aware of the current status or presence of all the target computing devices in the set of target computing devices (e.g., a datacenter). In this scenario, the processing of the version filter information may not be done prior to receiving a request from a previously unknown or forgotten target computing device.

At block 606, the computing device management component 106 determines a distribution of the version filter information for the set of computing devices. In one embodiment related to target computing devices, if individual target computing devices are identified in the version update information, the determination of the distribution can correspond to the selected or identified target computing devices. In another embodiment, the distribution to a set of target computing devices may correspond to random or pseudo random selection of target computing devices from a set of computing devices. Accordingly, the selected distribution can correspond to an evaluation of the random or pseudo-random processes. In a further embodiment, the distribution to a set of target computing devices can correspond to weighted distribution of target computing devices. For example, the weighting of the set of target computing devices may be utilized to select a test group to implement an update. A second set of weights can then be selected to stagger the implementation to a larger group and can then be repeated several times. In other embodiments, the computing device management component 106 may also implement additional time delays or distribution techniques beyond any distribution information provided in the update request.

At block 608, the computing device management component 106 implements the distribution by modifying version filter in accordance with the determined distribution. At block 610, the routine 600 terminates.

Figure 7:
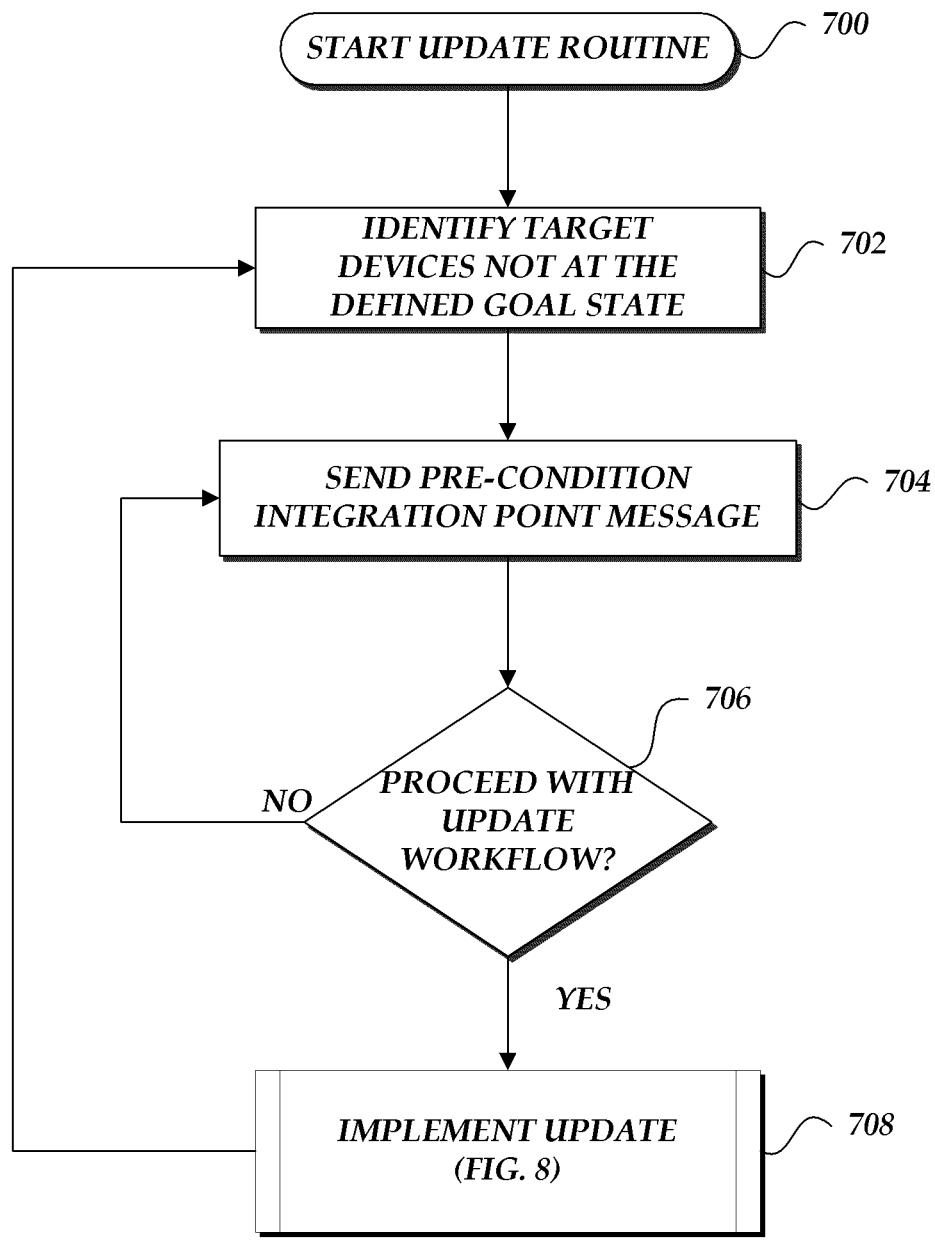
FIG. 7 is a flow diagram illustrating an update routine for an update implementation using integration points.

FIG. 7 illustrates a routine 700 for implementing a client specific workflow update procedure using client integration points. The update procedure is implemented by a computing device management component 106 and a local computing device management component 116 on a target computing device, such as a host computing device 104, a computing device 120, or a client target device 122. Although routine 700 will be described with regard to the computing device management component 106 and the local computing device management component 116, one skilled in the relevant art will appreciate that one or more portions of routine 700 may be implemented by other components of the computing device management component 106 or target computing device.

At block 702, computing device management component 106 identifies one or more target computing devices that are not at the defined goal state and require updates. The identified target computing devices may require updates to operating systems and software applications that are executing on the target computing devices. The target computing devices with pending updates can be identified using the methods described herein, such as those discussed with respect to FIG. 3.

The computing device management component 106 can also identify target computing devices that have been associated with a host set in accordance with one or more host set parameters. Each host set can include one or more target computing devices. Each host set can have one or more host set parameters. The host set parameters can be configured to control the rate at which hosts are processed. The rate at which target computing devices are processed can be determined by a combination of the host sets and the host set parameters. In one instance, the host set parameters can be used to determine the maximum number of target computing devices that can receive an update simultaneously. In one embodiment the computing device management component 106 can use a semaphore associated with a host set to control the maximum number of host computing devices 106 that are updated simultaneously.

The computing device management component 106 can monitor and track which target computing devices is associated with each host set. For example, there could be fifty target computing devices partitioned into host sets consisting of ten target computing devices in each set. The computing device management component 106 can monitor and track each host set and each target computing device within the set. The computing device management component 106 can identify one or more target computing devices within each host set in accordance with the host set parameters that is not at the defined goal state. In an illustrative embodiment, the computing device management component 106 can obtain information that identifies whether the target computing device satisfies the desired version goal state. Additionally, the resulting information can also include information identifying any updates that should be implemented by the target computing device or the update information itself.

At block 704, the computing device management component 106 sends a pre-condition integration point message to the client management device 118. In embodiments where the client management device 118 registers a pre-condition integration point, the computing device management component 106 sends a pre-condition message that identifies the target computing device scheduled to receive the update. The message can also include additional details about the update that the target computing device is scheduled to receive. The pre-condition integration point allows the client management device 118 to determine whether to initiate the update process for the identified target computing device. The pre-condition message is sent prior to performing any mutable actions related to the processing of an update for the target computing device. If the identified target computing device progresses past the pre-condition state, the computing device management component 106 can initiate mutable processes on behalf of the target computing device, such as acquiring a semaphore for the target computing device. The computing device management component 106 can send the message to the client management device 118 through an asynchronous messaging service. The computing device management component 106 expects the client management device 118 to respond to the pre-condition integration point message.

At decision block 706, the computing device management component 106 determines whether to proceed with the update workflow based on the response of the client management device 118. The client management device 118 can instruct the computing device management component 106 to proceed with the update workflow. If computing device management component 106 determines that an update can be applied to the target computing device, the workflow progresses to block 708 to implement the update, as further described in association with FIG. 8.

The client management device 118 can instruct the computing device management component 106 not to proceed with the update workflow. In one instance the client management device 118 can instruct the computing device management component 106 to repeat the current workflow step, which is the pre-condition phase. In some embodiments the computing device management component 106 can wait for a period of time before re-sending the pre-condition integration point message to the client computing device 118. At the pre-condition state, no mutable operations have been performed and other target computing devices can undergo updates while the other target computing device is waiting. Each target computing device at the pre-condition state can continue to progress independently of other target computing devices.

In some embodiments, when the computing device management component 106 does not receive a response from the client management device 118, the computing device management component 106 can proceed with the update workflow. In other embodiments, the computing device management component 106 can repeat the pre-condition state when it does not receive a response.

After the update is implemented, the routine 700 can be repeated until the target computing devices arrive at the defined goal state.

Figure 8:
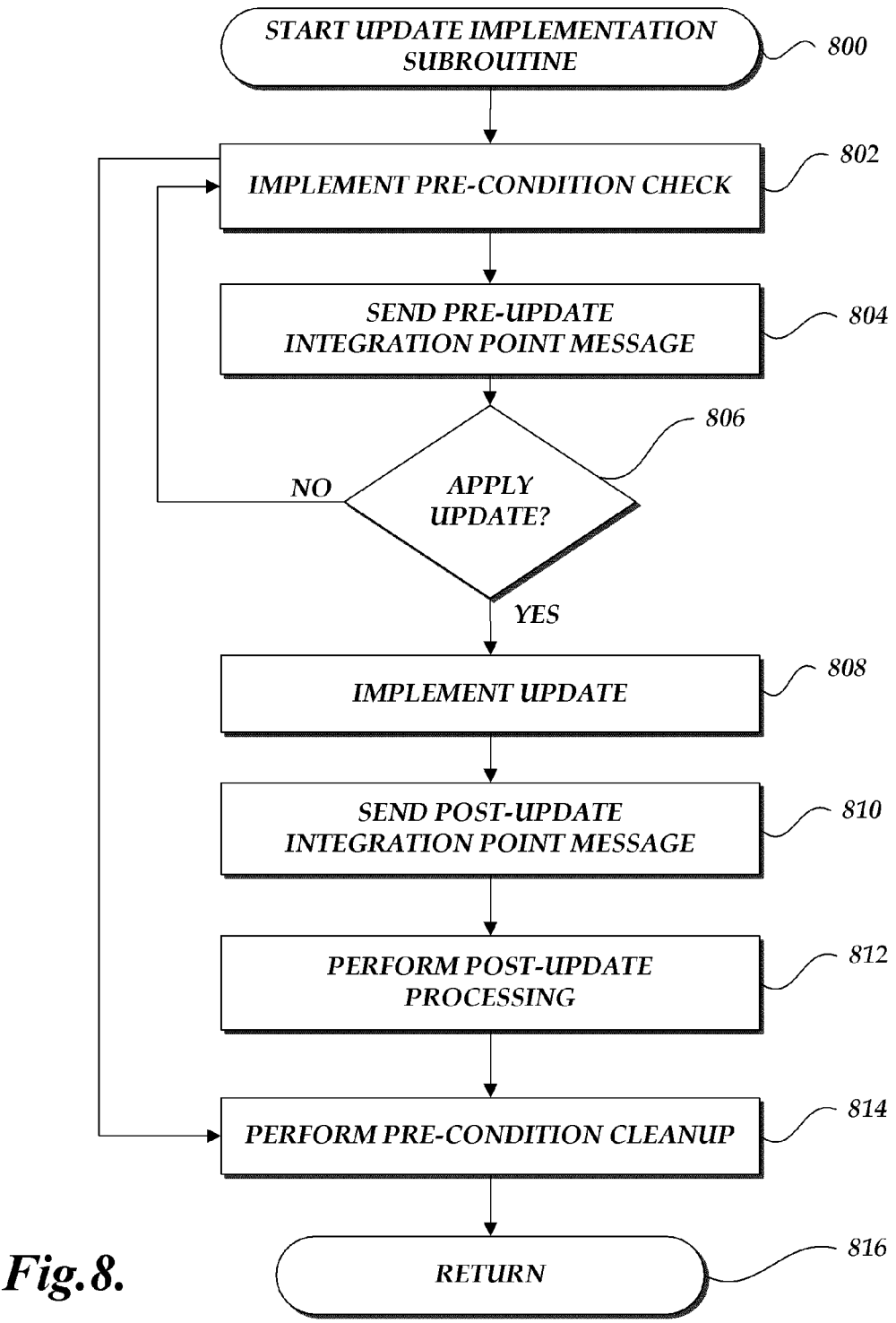
FIG. 8 is a flow diagram illustrating an update implementation subroutine using integration points.

FIG. 8 illustrates a subroutine 800 for update implementation based on information provided by the computing device management component 106. Illustratively, the computing device management component 106 and/or the local computing device management component 116 can implement subroutine 800 as part of the execution of block 708 (FIG. 7).

At block 802 the computer device management component 106 implements the pre-condition check. In the pre-condition check state the computing device management component 106 performs potentially mutable operations on behalf of the target computing device prior to update deployment. Goal-state monitoring can still occur during in this state. If the deployment of the update is suspended or in general the goal state becomes satisfied, the target processing device can transition directly to pre-condition cleanup state at block 814.

At the pre-condition check state the computing device management component 106 can control the rate at which target processing devices are updated. For example, a client may not want more than a certain number of devices updated at the same time. Illustratively, the number of simultaneous updates can be limited to properly balance the load on the remaining target processing devices in a host set. In one embodiment, the computing device management component 106 can prepare the target processing devices for deployment of the update by acquiring a semaphore. A semaphore can be associated with a host set and can be used to limit the maximum number of target processing devices simultaneously prepared for updates. In other embodiments, other processes and methods can be used to control the relative rate at which targets are updated. In another embodiment the computing device management component 106 can be configured to process updates at a certain interval. Alternatively, the client management device 118, could dynamically control the rate at which updates are applied by allowing target computing devices to proceed with the update workflow in block 706 (FIG. 7) based on an algorithm, threshold, time, or other parameters. Target sets can also be used to help process and organize the processing of the target processing devices. At the pre-condition check the computing device management component 106 performs operations to prepare the target processing device for the update. After the computing device management component 106 prepares the target for the update, the process proceeds to block 804.

At block 804, the computing device management component 106 sends a pre-update integration point message to the client computing device 118. The pre-update message informs the client computing device 118 that the target computing device has acquired all pre-conditions and is prepared for the update to be deployed. The message can also include additional details about the update for the target computing device. The pre-update integration point allows the client management device 118 to determine whether to perform client-side actions prior to the implementation of the update. The client management device 118 can perform actions in preparation for the update that are related to the operation of the target processing device. Illustratively, there may be client-side processes that are associated with and depend upon the operation of the target processing device. When the target processing device is being updated, the client-side processes may need to be diverted to another processing device, such as a client target device 122. For example, client management device 118 may communicate with other related computing systems, adjust operating parameters, or perform other processes in anticipation of an update being performed on the target computing device.

The computing device management component 106 expects the client management device 118 to send a pre-update response message. The computing device management component 106 will determine how to proceed at block 806 based on the response from the client computing device 118. In some embodiments a pre-update integration point message is not registered with the client computing device and the target computing device can proceed to implement the update at block 808.

At decision block 806, the computing device management component 106 determines whether to apply the update based on the response of the client management device 118. The client management device 118 can provide instructions to the computing device management component 106 to apply the update. If computing device management component 106 determines to apply the update, the workflow progresses to block 808 to implement the update.

The client management device 118 can instruct the computing device management component 106 not to proceed with the update. In one instance the client management device 118 can instruct the computing device management component 106 to repeat the current workflow step, which is the pre-condition check. In some embodiments the computing device management component 106 can wait for a period of time before re-sending the pre-update integration point message to the client management device 118. In some embodiments, if the client management device 118 does not respond, the target computing device will transition to the pre-condition cleanup state if the update is not applied.

In some embodiments, when the computing device management component 106 does not receive a response from the client management device 118, the computing device management component 106 will proceed with the implementation of the update at block 808. In other embodiments, the computing device management component 106 can return to the pre-condition check at block 802 if a response is not received.

At block 808 the target computing device can implement the update. The update can be can be implemented by the local computing device management component 116 as illustrated and described in association with FIG. 4B. After the update has been implemented the process proceeds to 810.

At block 810 the computing device management component 106 sends a post-update message to the client management device 118. The post-update message informs the client management device 118 that the update has been implemented. The post-update integration point allows the client management device 118 to perform post-update processes after the update has been implemented. The workflow proceeds to block 812 to perform post-update processing.

At block 812 any post processing operations are performed. The post-update processing can include testing and monitoring of the target computing device. For example, testing protocols and checks may be performed on the target computing device to verify proper operation prior to returning the host computing device to its previous operational state. After the post-update processing is performed, the process proceeds to perform pre-condition cleanup at block 814.

At block 814 the computing device management component 106 performs pre-condition cleanup. The pre-condition cleanup returns the target computing device to its previous operational state. The pre-condition cleanup process removes conditions done on behalf of the target computing device for the update routine. For example, the computing device management component 106 could release semaphores. After the pre-condition cleanup is complete, the process proceeds to 816.

At block 816, the computing device management component 106 returns to block 712 on FIG. 7. At which point update routine can be repeated until the goal-state is achieved.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing a target computing device, wherein the target computing device hosts one or more virtual machine instances, the method comprising:

under control of one or more processors configured with specific executable instructions, obtaining, by a computing device management component, version information for software executing on a target computing device;

determining, by the computing device management component, a distribution of modifications for a plurality of target computing devices based on the version information, wherein the plurality of target computing devices are arranged in one or more one host sets, wherein each host set comprises at least one target computing device of the plurality of target computing devices;

for each of the target computing devices of a host set of the one or more host sets, prior to performing operations to prepare the target computing device to receive a scheduled modification, transmitting a pre-condition message to a client computing device indicating that the target computing device is scheduled to receive the scheduled modification;

receiving a pre-condition response message from the client computing device with instructions on whether to proceed with the scheduled modification;

based, at least in part, on the instructions received from the pre-condition response message, determining whether performing the scheduled modification on the target computing device exceeds a modification rate threshold of the host set, wherein the modification rate threshold defines a number of target computing devices within the host set that can receive the scheduled modification simultaneously;

in response to determining that performing the scheduled modification on the target computing device does not exceed the modification rate threshold of the host set, preparing the target computing device to receive the scheduled modification by performing a pre-condition operation;

prior to applying the scheduled modification, transmitting a pre-modification message to the client computing device indicating that the target computing device is prepared to receive the scheduled modification;

receiving a pre-update response message from the client computing device with instructions on whether to apply the scheduled modification to the target computing device;

transmitting a post-update message to the client computing device indicating that the target computing device received the scheduled modification, and performing a pre-condition cleanup operation on behalf of the target computing device.

2. The method of claim 1 further comprising instructing the target computing device to proceed with the scheduled modification based on the pre-update response received from the client computing device.

3. The method of claim 1, wherein each host set has a one or more host set parameters that, at least in part, influence the rate of the distribution of modifications.

4. The method of claim 1, wherein the pre-condition operation is a mutable operation that affects the target computing device.

5. The method of claim 1, wherein the pre-condition operation is acquiring a semaphore on behalf of the target computing device.

6. The method of claim 5, wherein the pre-condition cleanup operation is releasing the semaphore on behalf of the target computing device.

7. A non-transitory, computer-readable storage media storing computer-readable instructions, that when executed instruct a processor to perform a method comprising:
obtaining, by a computing device management component, version information for software executing on a target computing device;
determining, by the computing device management component, a distribution of modifications for a plurality of target computing devices based on the version information, wherein the distribution of modifications is performed in accordance with a workflow process, wherein the plurality of target computing devices are arranged in one or more one host sets, wherein each host set comprises at least one target computing device of the plurality of target computing devices;
for each of the target computing devices of a host set of the one or more host sets, at one or more defined points during the workflow process,
transmitting a message to a client computing device at one of the one or more defined points during the workflow process, the message comprising a workflow status of the target computing device;
receiving a response message from the client computing device with instructions on how to process the workflow status of the target computing device;
in response to the instructions received from the client computing device to proceed with a modification of target computing device, determining whether implementing the modification of the target computing device exceeds a modification rate threshold of the host set, wherein the modification rate threshold defines a number of target computing devices within the host set that can receive the modification simultaneously; and
in response to determining that performing the modification on the target computing device does not exceed the modification rate threshold of the host set, causing the target computing device to implement the modification.

8. The method of claim 7, wherein the instructions are to proceed with processing the target computing device.

9. The method of claim 7, wherein the instructions are to delay processing the target computing device.

10. The method of claim 7, wherein the message includes target computing device identification data.

11. The method of claim 7, wherein the response message includes instructions to suspend the modification.

12. The method of claim 7, wherein the target computing device is configured to host one or more virtual machine instances.

13. The method of claim 7, wherein the target computing device is a host computing device.

14. The method of claim 7, wherein the software is an operating system.

15. A computer-implemented method for managing a target computing device, wherein the target computing device hosts one or more virtual machine instances, the method comprising:
under control of one or more processors configured with specific executable instructions,
obtaining, by a computing device management component, version information for software executing on individual target computing devices of a plurality of target computing devices;
determining, by the computing device management component, a distribution of modifications for the plurality of target computing devices based on the version information, wherein the distribution of modifications is performed in accordance with a workflow process, wherein the plurality of target computing devices are arranged in one or more one host sets, wherein each host set comprises at least one target computing device of the plurality of target computing devices;
for at least some of the target computing devices included in the plurality of target computing devices, at one or more defined points during the workflow process,
transmitting one or more messages to a client computing device at one of the one or more defined points during the workflow process;
receiving one or more responses from the client computing device in response to the one or more messages;
based, at least in part, on a response of the one or more responses providing instructions to proceed with a modification of the target computing device, determining whether implementing the modification of the target computing device exceeds a modification rate threshold of an associated host set, wherein the modification rate threshold defines a number of target computing devices of the associated host set that can receive the modification simultaneously; and
in response to determining that implementing the modification of the target computing device does not exceed the modification rate threshold, implementing the modification of the target computing device.

16. The method of claim 15, wherein the one or more messages are transmitted based on policy-based parameters.

17. The method of claim 15, wherein the one or more messages are transmitted to the client computing device using a messaging system.

18. The method of claim 17, wherein the messaging system is asynchronous.

19. The method of claim 15, wherein the one or more responses are transmitted to the computing device management component using a messaging system.

20. The method of claim 19, wherein the messaging system is asynchronous.

21. The method of claim 15, wherein the one or more message are transmitted to the client computing device in accordance with an application programming interface (API).

22. The method of claim 15, wherein the one or more responses are transmitted to the computing device management component in accordance with an application programming interface (API).

23. The method of claim 15, wherein at least one of the messages is a pre-update message configured to allow the client computing device to perform an update process prior to the target computing device implementing the modification.

24. The method of claim 15, wherein at least one of the messages is a post-update message configured to allow the client computing device to perform a post-update process after the modification has been implemented.

25. The method of claim 24, wherein the post-update process is testing the target computing device.

26. The method of claim 15, wherein the plurality of target computing devices are arranged in one or more host sets, wherein each host set has one or more host set parameters that, at least in part, influence the workflow process.

27. A system comprising,
   a plurality of target computing devices, wherein the plurality of target computing devices are arranged in one or more one host sets, wherein each host set comprises at least one target computing device of the plurality of target computing devices;
   a computing device management component having one or more processors configured with specific executable instructions configured to:
   for one or more of the plurality of target computing devices,
      determine whether version information received from the target computing device corresponds to a desired goal state;
      implement an update procedure for the target computing device when the target computing device does not correspond to the desired goal state, wherein the update procedure is performed in accordance with a workflow process; at one or more defined points during the workflow process,
      transmit one or more messages to a client computing device at one of the one or more defined points during the workflow process;
      receive one or more responses from the client computing device in response to the one or more messages;
      based, at least in part, on a response of the one or more responses providing instructions to proceed with the update procedure, determine that performing the update procedure to the target computing device does not exceed a modification rate threshold of an associated host set, wherein the modification rate threshold defines a number of target computing devices of the associated host set that can implement the update procedure simultaneously; and
      implement the update procedure;
   wherein the workflow process pauses at each of the one or more defined points until a response is received providing instructions on how to proceed at the defined point.

28. The system of claim 27, wherein the messages identify the target computing device.

29. The method of claim 27, wherein the one or more responses include instructions to perform one of the following operations: proceed with the workflow process, delay the workflow process, or suspend the workflow process.

30. The system of claim 27, wherein the desired goal state is a version of software.

* * * * *